(12) United States Patent
Murphy et al.

(10) Patent No.: US 7,655,340 B2
(45) Date of Patent: Feb. 2, 2010

(54) ULTRA SHORT HIGH PRESSURE GRADIENT FLOW PATH FLOW FIELD

(75) Inventors: Michael W Murphy, Manchester, NY (US); Wenbin Gu, Pittsford, NY (US); Lewis J DiPietro, West Henrietta, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 250 days.

(21) Appl. No.: 10/758,816

(22) Filed: Jan. 16, 2004

(65) Prior Publication Data

US 2005/0158603 A1 Jul. 21, 2005

(51) Int. Cl.
*H01M 2/14* (2006.01)
(52) U.S. Cl. .............................. 429/38; 429/34; 429/39
(58) Field of Classification Search ............... 429/12, 429/25, 34
See application file for complete search history.

(56) References Cited

U.S. PATENT DOCUMENTS

| | | | |
|---|---|---|---|
| 6,541,147 B1 | 4/2003 | McLean et al. | |
| 6,960,403 B2 * | 11/2005 | Morse et al. | 429/39 |
| 7,201,991 B2 * | 4/2007 | Komada et al. | 429/39 |
| 7,258,944 B2 * | 8/2007 | Tsunoda | 429/39 |
| 2001/0006745 A1 * | 7/2001 | Bronoel et al. | 429/32 |

FOREIGN PATENT DOCUMENTS

JP  2002-008682  *  1/2002

OTHER PUBLICATIONS

S.J.C. Cleghorn, C.R. Derouin, M. S. Wilson, S. Gottesfeld; "A Printed Circuit Board Approach To Measuring Current Distribution In A Fuel Cell"; Journal of Applied Electrochemistry 28 (1998) pp. 663-672.

* cited by examiner

*Primary Examiner*—Patrick Ryan
*Assistant Examiner*—Cynthia Lee
(74) *Attorney, Agent, or Firm*—Harness, Dickey & Pierce, P.L.C.

(57) ABSTRACT

The present invention is directed to a planar flow field design having an intake manifold and an exhaust manifold which are configured in two offset planes. A relatively short passage extends from the intake manifold through the exhaust manifold and terminates at a reactive face of a membrane electrode assembly (MEA) such that a differential flow distribution is provided from the intake manifold through the passage and across a reactive face of the MEA to the exhaust manifold.

23 Claims, 8 Drawing Sheets

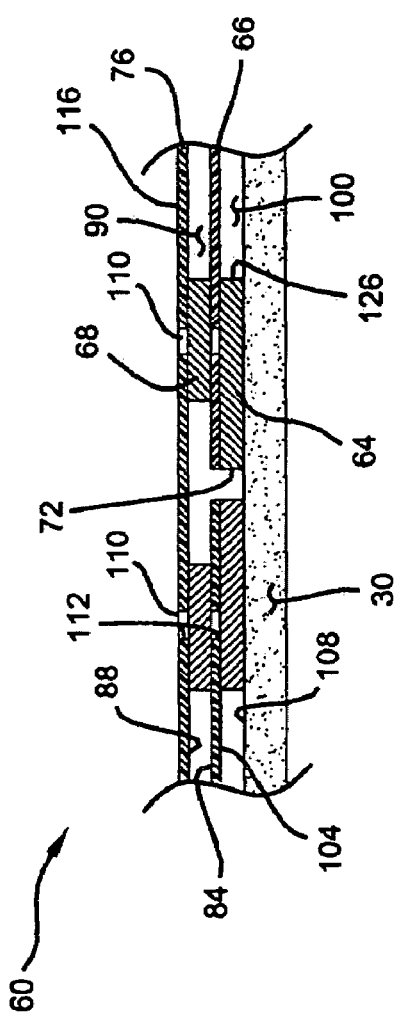
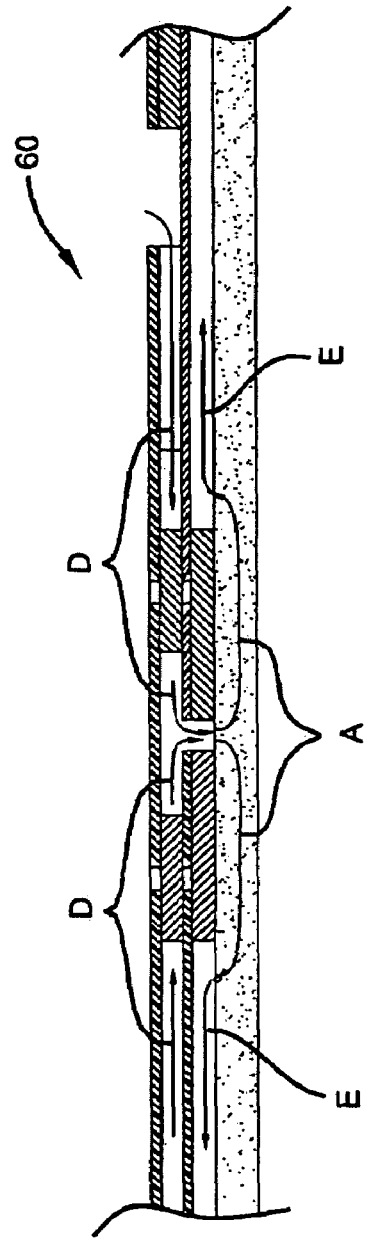

ULTRA SHORT HIGH PRESSURE GRADIENT FLOW PATH FLOW FIELD

FIELD OF THE INVENTION

The present invention relates to PEM fuel cells and more particularly to a separator flow field plate in which relatively small pressure drop is required to achieve the necessary flow rates.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied as the fuel to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

Traditionally, the electrically conductive plates sandwiching the MEAs contain a reactant flow field for distributing the fuel cell's gaseous reactants (i.e., hydrogen and oxygen in the form of air) over the surfaces of the respective anode and cathode (referred collectively herein as active area). These reactant flow fields conventionally include a plurality of lands that define a plurality of flow channels therebetween through which the gaseous reactants flow from a supply header at one end of the flow channels to an exhaust header at the opposite end of the flow channels.

The requirements for a well-performing flow field may be characterized into local requirements and global requirements. A local requirement generally applies to every point on the active area and a global requirement applies to the entire flow field design. To satisfy the local requirements of a well-performing flow field, the flow field should (1) deliver gas and humidification, (2) remove exhaust gases and (3) remove liquid water. To satisfy the global requirements of a well-performing flow field, the flow field should (4) satisfy local requirements at all points on the active area, (5) satisfy local requirements with a reasonably low overall pressure drop, (6) satisfy local requirements consistently over time thus producing stable flow, and (7) satisfy local requirements at all required flow and load conditions.

The requirement for stable flow (6), is a difficult requirement to meet. Two reasons may be cited for this difficulty. First, it is difficult to determine exactly when stable flow has been achieved because there is more than one condition under which it can be successfully accomplished. Stable flow requires the consistent removal of liquid water. However, water can be removed in more than one way. For example, in some cases gas velocity may be sufficiently high such that collection of liquid water is not possible. In other cases, liquid water may collect and then a pressure build up may occur, causing the liquid water to move out. In some cases low gas velocity and an inability to build pressure cause unfavorable water removal conditions and an unstable gas flow.

The second reason stable flow is difficult to meet is that in order to satisfy it, other flow field requirements must be compromised. For example, the aspects of a flow field design that satisfy requirements (3) and (6) directly compete with design aspects that satisfy requirements (4) and (5).

The following three examples demonstrate the difficulty in designing a flow field that can satisfy all requirements concurrently, including establishing either one of the two possible stable flow conditions needed for consistent water removal. In a first example, it is possible to achieve stable flow by establishing a high gas velocity condition. A high gas velocity condition is established by designing a flow path having a high pressure gradient. However, for an averaged-sized active area, the consequence of such a design is a flow field having an unacceptably high overall pressure drop. In this way, requirements (3), (4), and (6) are met while (5) is not satisfied.

In a second example, in order to reduce the overall pressure drop, Example 1 may be modified to have more parallel flow paths that are shorter in length. However, in reaching an acceptably low pressure drop, gas velocities become reduced to a level where liquid water is allowed to build up. Then, with the establishment of many parallel flow paths, removal of liquid water by a pressure build-up is no longer possible because a pressure build-up cannot be raised. Accordingly, requirements (4) and (5) are met while (3) and (6) remains unsatisfied.

In a third example, in order to facilitate liquid removal by a pressure build-up, Example 2 may be modified by taking away some of the parallel flow paths. However, if the requirement of a low overall pressure drop is to be maintained, the length that can be added to each flow path to compensate for removing flow paths is limited. In this case, all the requirements are met except the one requiring the flow field to cover the entire active area. Specifically, requirements (3), (5) and (6) are met and (4) is not satisfied.

SUMMARY OF THE INVENTION

The present invention is directed to a flow field design for achieving stable gas flows in the presence of liquid water, as well as for heightening the oxygen partial pressure in the catalyst layer in order to raise cell performance. The flow field design includes an intake manifold and an exhaust manifold which are configured in two offset planes. A relatively short passage extends from the intake manifold to the exhaust manifold and terminates at a diffusion medium such that fluid communication is provided from the intake manifold through the passage and the diffusion medium to the exhaust manifold. Thus, the present invention may be employed to establish convective, interdigitated-like flow through a diffusion medium in order to raise the oxygen partial pressure at the catalyst layer.

In one aspect, the present invention is directed to a fuel cell having an first manifold defined between an membrane electrode assembly (MEA) and a first gas-impermeable element with a set of spacers disposed in the first manifold. A second manifold is defined between the first planar element and a second gas-impermeable element. The first gas-impermeable element and the spacers have an orifice formed therethrough such that a flow path is established from the first manifold across a reactive face of the MEA to the second manifold.

In another aspect, the present invention is directed to a fuel cell having an MEA, a first separator sheet disposed in spaced relation to the diffusion medium sheet to define a first manifold therebetween and a first set of spacers disposed in the first manifold, each of the first set of spacers having an orifice transverse to the first manifold formed therein. A second separator sheet is disposed in spaced relation to the first separator sheet to define a second manifold therebetween transverse to the orifice, and a second set of spacers are disposed in the second manifold. A flow path is defined between the first manifold and the second manifold through the orifice across the reactive face of the MEA.

In yet another aspect, the present invention is directed to a method of making a separator plate for a fuel cell in which a first conductive sheet is laminated onto a first film sheet, and a portion of said first conductive sheet is removed from the first film sheet such that a remaining portion of the first conductive sheet defines a first array of spacers. A passage is formed through each of the spacers in the first array of spacers and the first film sheet to establish a series of parallel flow paths. A second conductive sheet is laminated onto a second film sheet, and a portion of the second conductive sheet is removed from the second film sheet such that a remaining portion of the second conductive sheet defines a second array of spacers. The second array of spacers are laminated to the first film sheet opposite the first array of spacers such that a first manifold is formed between the first film sheet and the second film sheet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a partial cross-sectional view of the separator plate of FIG. 3A taken along line 4-4;

FIG. 4B is a partial cross-sectional view of the separator plate of FIG. 4A illustrating the respective delivery, active area and exhaust legs of the flow path;

DETAILED DESCRIPTION OF THE PREFERRED EMBODIMENT

The following description of the preferred embodiment is merely exemplary in nature and is in no way intended to limit the invention, its application, or uses.

Figure 1:
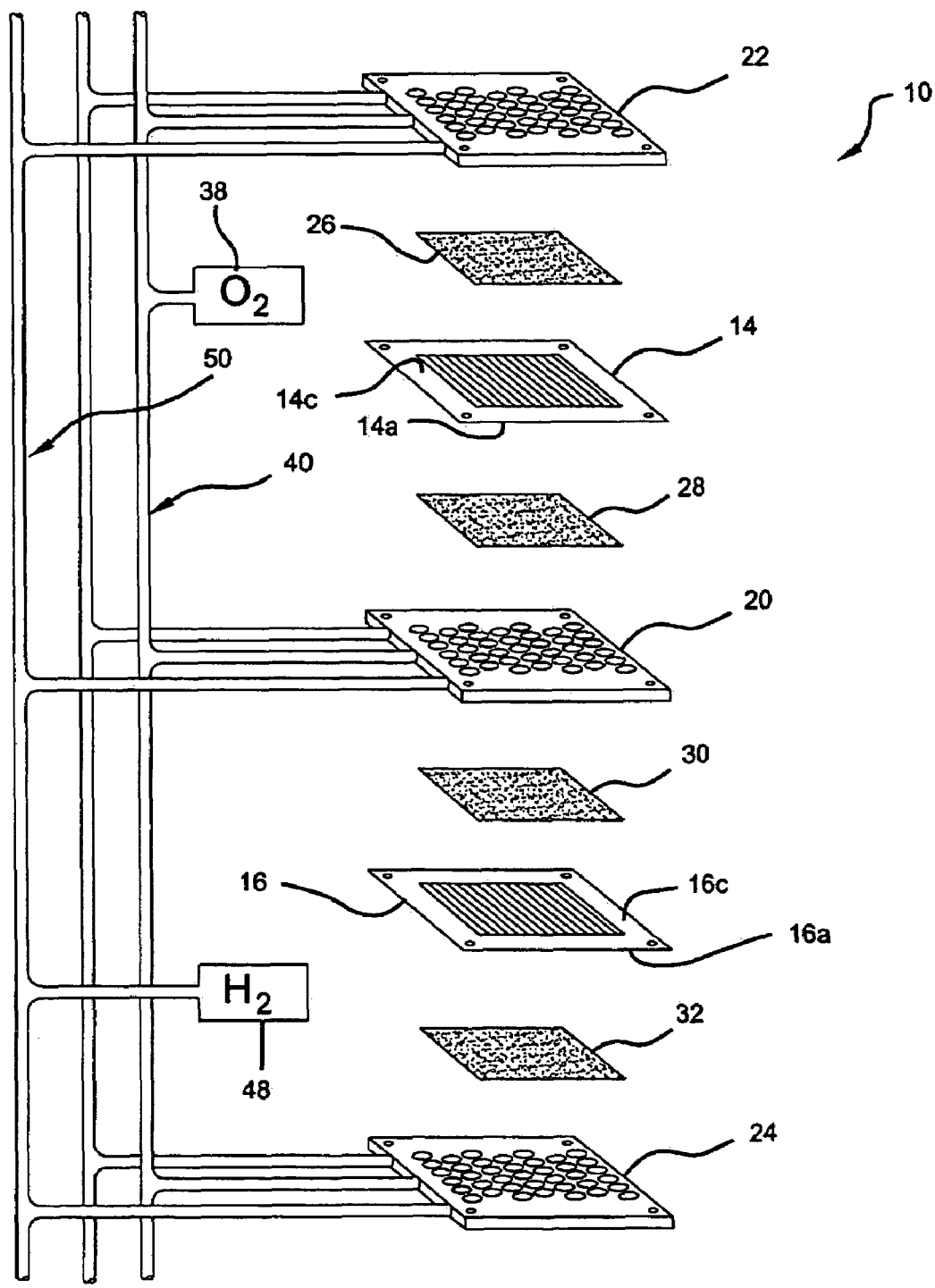
FIG. 1 is an isometric exploded view of a fuel cell including a pair of complimentary spring seals in a PEM fuel cell stack.

FIG. 1 schematically depicts a partial PEM fuel cell stack 10 having membrane-electrode-assemblies (MEAs) 14, 16 separated from each other by a non-porous, electrically-conductive bipolar plate 20. The MEAs 14 and 16 and bipolar plate 20 are stacked together between non-porous, electrically-conductive, bipolar plates 22 and 24. Flow-interfering media 26, 28, 30 and 32 which are porous, gas-permeable, and electrically conductive sheets press up against the electrode faces of the MEAs 14 and 16 and serve as primary current collectors for the electrodes. The flow-interfering media 26, 28, 30 and 32 also provide mechanical supports for the MEAs 14 and 16, especially at locations where the MEAs are otherwise unsupported in the flow field. The flow-interfering media 26, 28, 30 and 32 further provide a fluid transport mechanism from the inlet manifold across the reactive face of the MEA to the exhaust manifold.

Bipolar plates 22 and 24 press up against the primary current collector 26 on the reactive cathode face 14c of the MEA 14 and the primary current collector 32 on the reactive anode face 16a of the MEA 16. The bipolar plate 20 presses up against the diffusion medium 28 on the reactive anode face 14a of the MEA 14 and against the primary current collector or diffusion medium 30 on the reactive cathode face 16c of the MEA 16. An oxidant gas such as oxygen or air is supplied to the cathode side of the fuel cell stack 10 from an oxygen or air source 38 via appropriate supply plumbing 40. Similarly, a fuel such as hydrogen is supplied to the anode side of the fuel cell stack 10 from a hydrogen source 48 via appropriate plumbing 50.

Figure 5A:
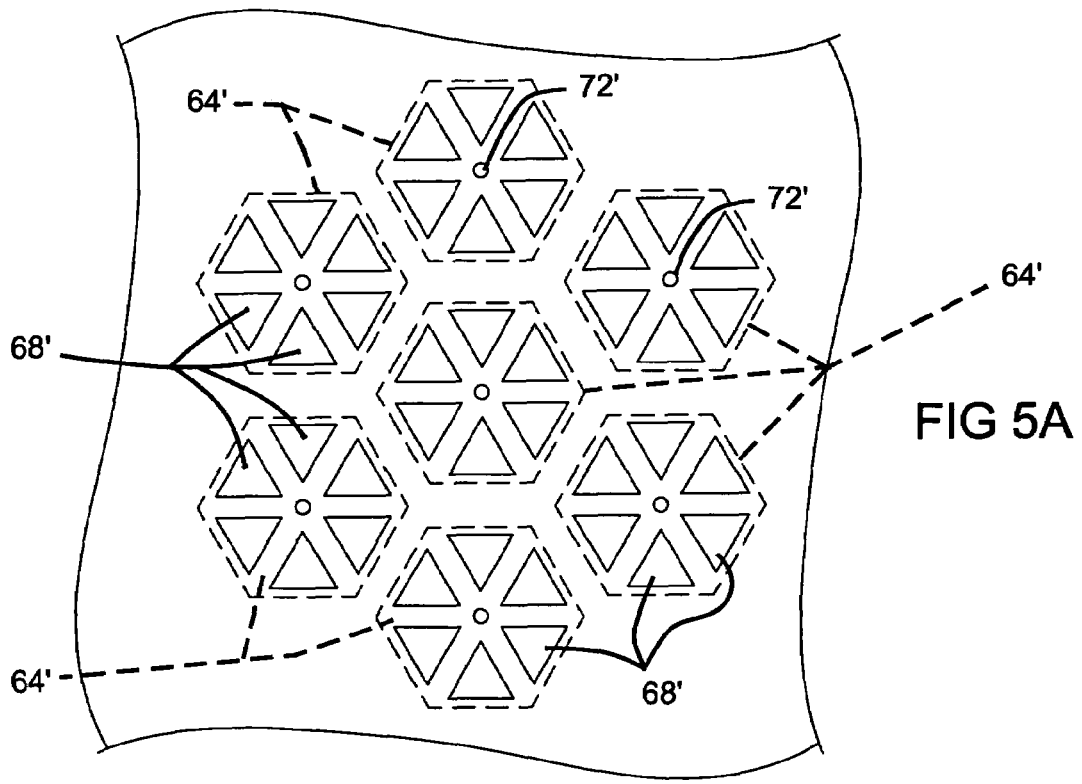
FIG. 5A is a partial plan view of the inlet side of a separator plate according to an alternate embodiment of the present invention.
Figure 5B:
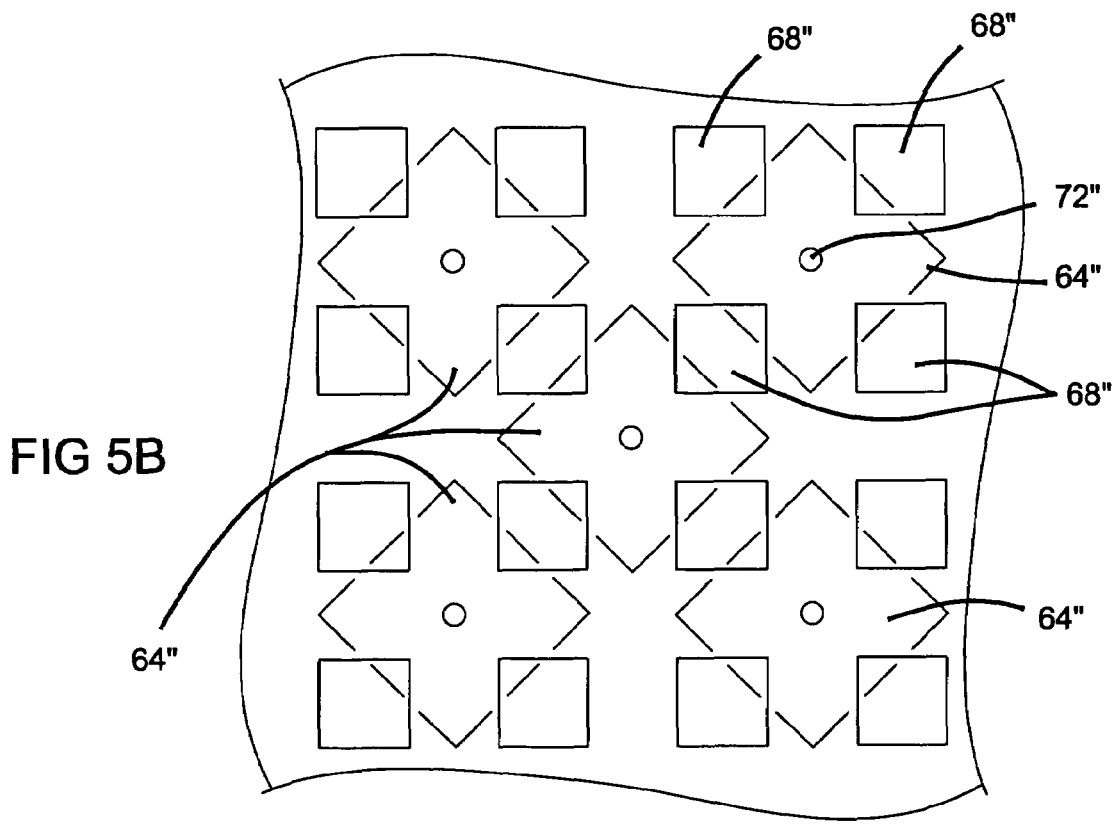
FIG. 5B is a partial plan view of the inlet side of a separator plate according to another alternate embodiment of the present invention.
Figure 6A:
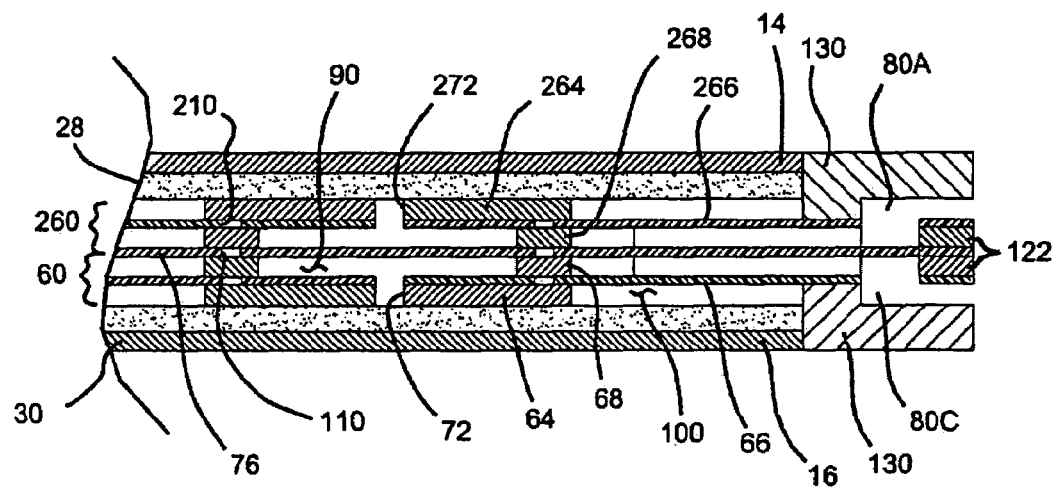
FIG. 6A is a cross-sectional view of a bipolar plate taken through the inlet header.
Figure 6B:
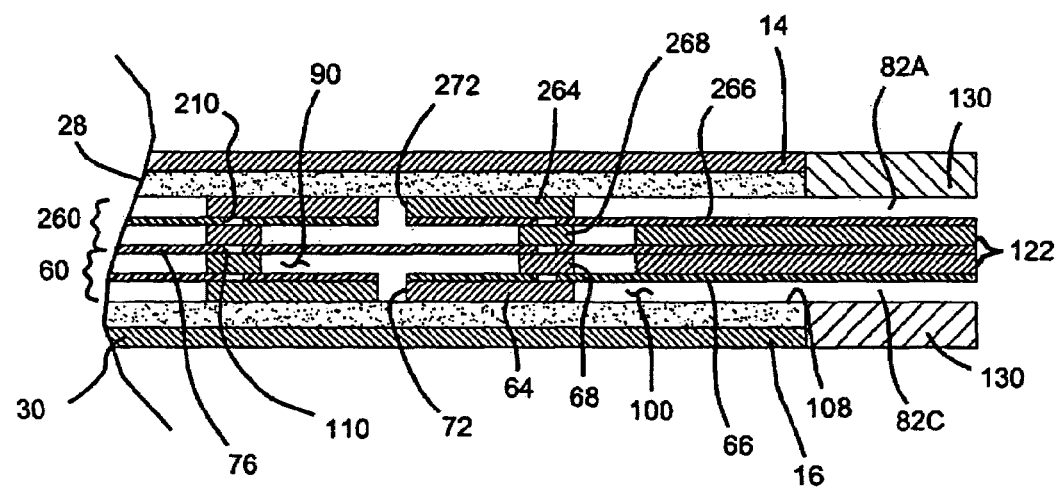
FIG. 6B is a cross-sectional view of a bipolar plate taken through the exhaust header.

With reference now to FIGS. 2, 3A, 3B and 4A a separator plate 60 according to the present invention will be described in greater detail. The separator plate 60 is configured to carry one of the reactant gases to a respective face of the MEA 16. It is appreciated that each bipolar plate 20, 22 and 24 comprise two separator plates 60 lying in a back to back orientation (FIGS. 5A and 5B). Separator plate 60 includes a first array of electrically conductive spacers or disks 64 arranged along a gas-impermeable sheet 66. An orifice 72 is formed through spacer 64 and sheet 66. Separator plate 60 also includes a second array of electrically conductive spacers or pillars 68 arranged along a gas-impermeable sheet 76. As best seen in FIGS. 6A and 6B, an inlet header 80A, 80C communicates reactant gas from the appropriate supply plumbing 40, 50 into the separator plate 60. An exhaust header 82A, 82C removes exhausted gas from the separator plate 60 as will be described.

As presently preferred, the spacers 64 in the first array are circular disks having a diameter of approximately 0.375" which are disposed on the first sheet 66 in a nested array such that the center of spacers 64 in adjacent rows/columns are offset with respect to one another. The orifice 72 formed through spacer 64 is about 0.050" (50 mils). Spacers 64 are distributed on first sheet 66 at a density of about 6.25 spacers per square inch. As presently preferred, the pillars 68 in the second array are also circular disks having a diameter of approximately 0.125' which are disposed on the first sheet 66 such that a subset of four pillars 68 are equiangularly superposed over at least a portion of the area defined by the subjacent spacer 64. Pillars 68 are distributed on first sheet 66 in a density of about 25 pillars per square inch.

While the above-described configuration of spacers 64 and pillars 68 are presently preferred, one skilled in the art will recognize that the size, shape, density, distribution and location of the spacers and pillars within the fuel cell may be selected in accordance with the specification and operational parameters of a given fuel cell application. For example, as illustrated in FIG. 5A, spacers 64' are configured as nested hexagons with an orifice 72' formed therethrough. A set of pillars 68' are configured as triangles with a subset of six triangles superposed over a portion of the area defined by the subjacent spacer 64'. In another example illustrated in FIG. 5B, spacers 64" are configured as nested squares with an orifice 72" formed therethrough. A set of pillars 68" are configured as squares with a subset of four squares superposed over an area defined by multiple subjacent spacers 64". The terms superposed and subjacent are used in relative terms herein, and one skilled in the art should recognize that the order of adjacent components within the fuel cell 10 may be inverted.

With reference again to FIGS. 2, 3A-3B and 4A-4D and FIG. 6A-6B, the separator plate 60 will be described in greater detail. An inboard major face 84 of the first sheet 66 and an inboard major face 88 of the second sheet 76 define an inlet manifold 90 therebetween. Fluid communication between the inlet manifold 90 and the inlet header 80 is established by a plurality of runners 92 formed in a frame 122. The frame 122 may be interposed between the first sheet 66 and the second sheet 76. For example, the frame 122 may be laminated between the first sheet 66 and the second sheet 76 and may circumscribe the pillars 68. The height of the inlet manifold 90 is defined by the height of the pillars 68. An exhaust manifold 100 is defined between an outer face 104 of the first sheet 66 and an adjacent face 108 of the diffusion medium 30. In this manner, the inlet manifold 90 and the exhaust manifold 100 function as a plenum throughout which the pressure is substantially constant, i.e., very little pressure differential within the manifold areas. Fluid communication from the exhaust manifold 100 to the outside of the stack is achieved by direct connection of this manifold to the atmosphere. In other words, manifold 100 is open to atmosphere all along its perimeter. The height of the exhaust manifold 100 is defined by the height of the disks 64. As presently preferred, the inlet header 80 is formed along one margin of the separator plate 60. No exhaust header, other than the direct connection of the manifold 100 to the atmosphere exists. However, one skilled in the art will recognize that the inlet header and exhaust header may be configured in any suitable manner to provide fluid communication of the reactant gas into and out of the flow field.

Electrically conductive connectors 110 are disposed through vias 112 formed through the first sheet 66, the pillars 68 and the second sheet 76. The connectors 110 are aligned to electrically connect the pillars 68 with the corresponding disks 64.

The connectors 110 provide electrical continuity from the diffusion medium 30 to an outside face 116 of the second sheet 76, thereby allowing current to be carried across the entire thickness of the separator plate 60 and consequently across the entire fuel cell stack 10. The connectors 110 may comprise vias having conductive material disposed entirely therein or alternatively on an inner circumferential wall thereof for example. The conductive material may comprise graphite for example.

With continued reference to FIGS. 4B-4D and 6A-6B, the operation of the separator plate 60 will be described. The flow path of the reactant gas is characterized in three distinct flow segments namely, a delivery leg (D), an active area leg (A) and an exhaust leg (F). During the delivery leg (D), the reactant gas enters the separator plate 60 at the inlet header 80 and flows through the inlet manifold 90. The reactant gas flows relatively freely (i.e., with no significant pressure drop and no predetermined path) around the respective pillars 68 and is contained within a lateral boundary (FIG. 3) in the inlet manifold 90 defined by an interior edge 120 of the frame 122. From the inlet manifold 90, the reactant gas is directed through the respective orifices 72 in the disks 64 and the first sheet 66.

The active area leg (A) is designed to have a controlled pressure drop. Because the active area leg (A) accounts for nearly all the pressure drop of the flow path, it includes a flow-interfering medium that has a well-controlled permeability, length and cross-sectional area. The flow-interfering medium has lower permeability relative to empty space in the inlet/exhaust manifolds 90, 100 in order to guarantee that the pressure drop of the active area leg (A) is significantly higher than the delivery leg (D) and exhaust leg (E). During the active area leg (A), the reactant gas enters the flow-interfering-medium 30 from the orifice 72 passes across the face of the MEA (not shown) and exits the flow-interfering medium 30 at an outer boundary 126 (FIG. 4A) of the spacer 64.

Figure 2:
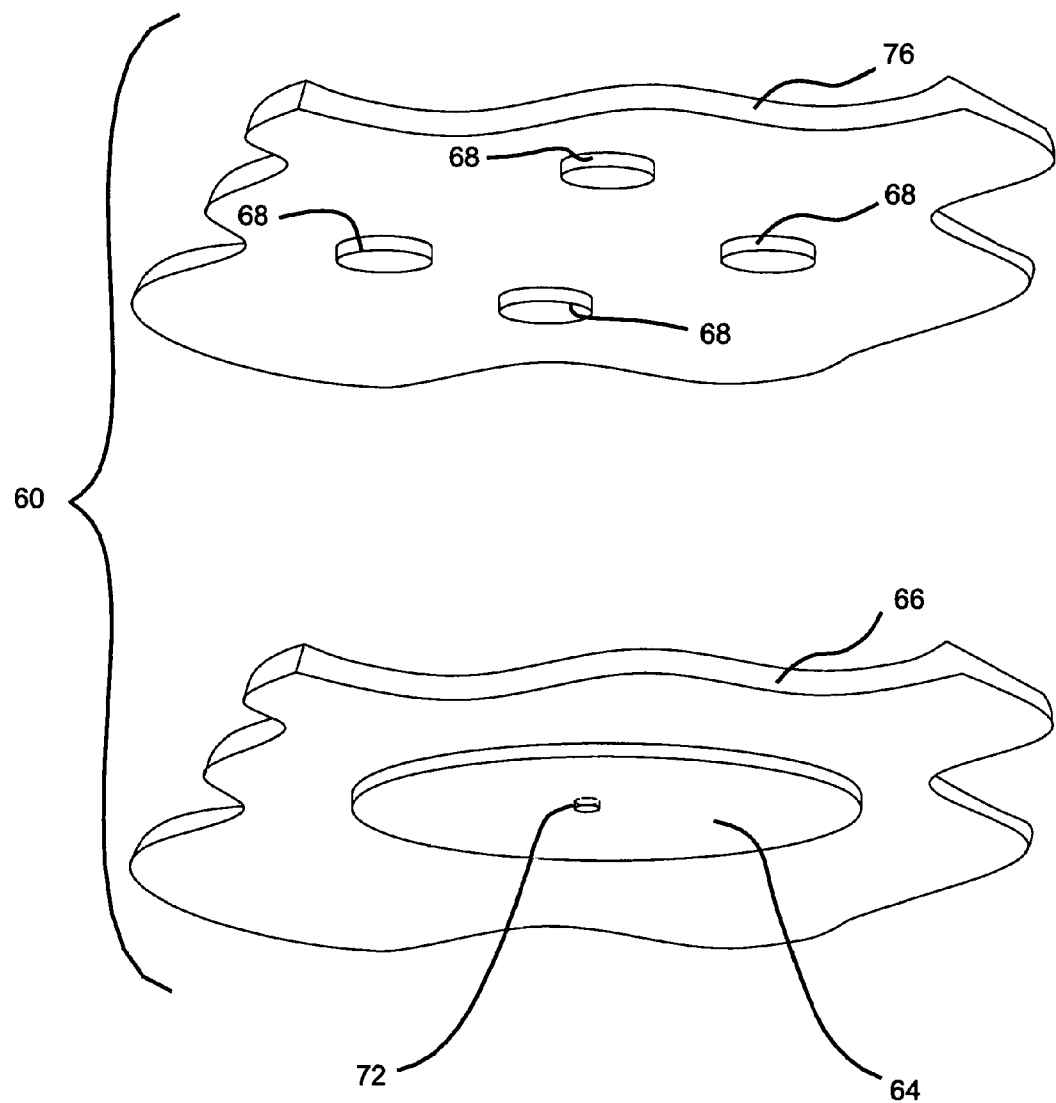
FIG. 2 is a partial exploded perspective view of the bipolar plate illustrated in FIG. 1.
Figure 3A:
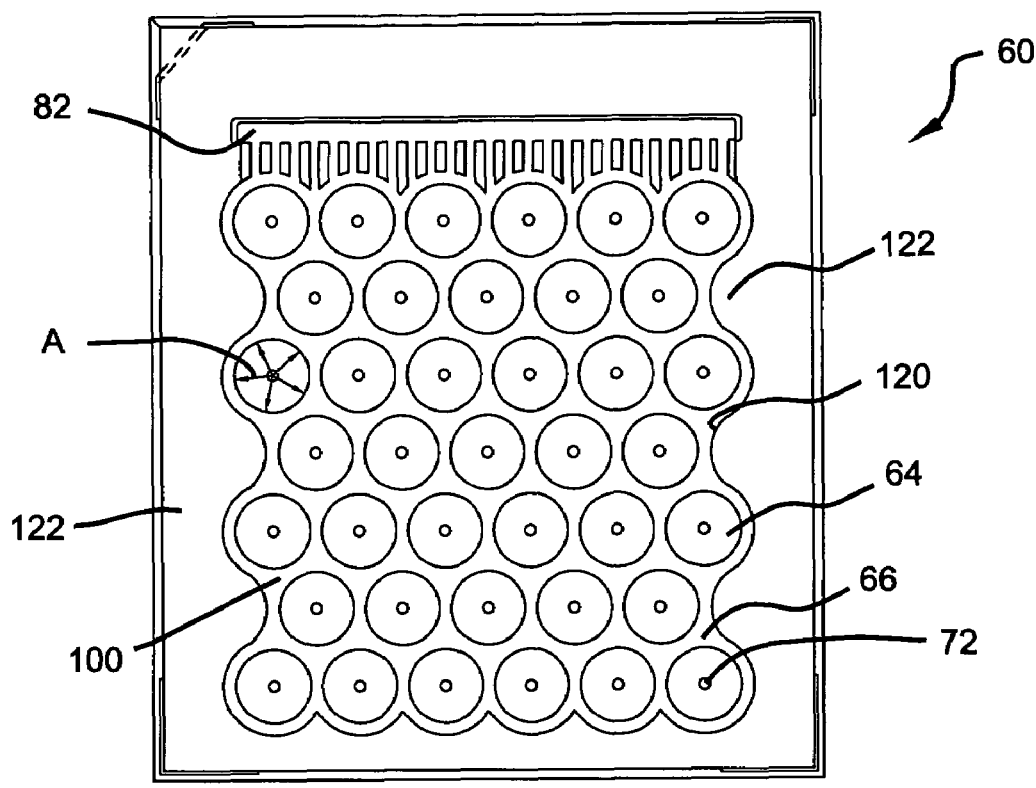
FIG. 3A is a plan view of the exhaust side of a separator plate according to a preferred embodiment of the present invention.
Figure 3B:
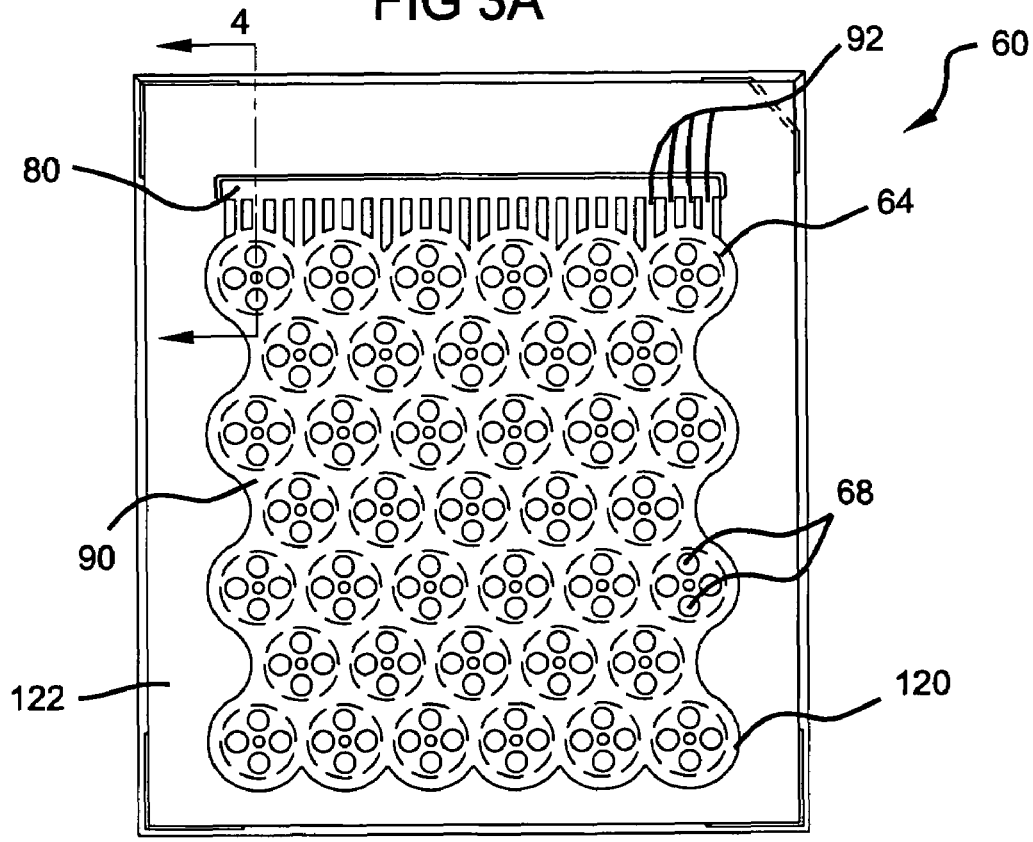
FIG. 3B is a plan view of the inlet side of the separator plate of FIG. 3A.
Figure 4C:
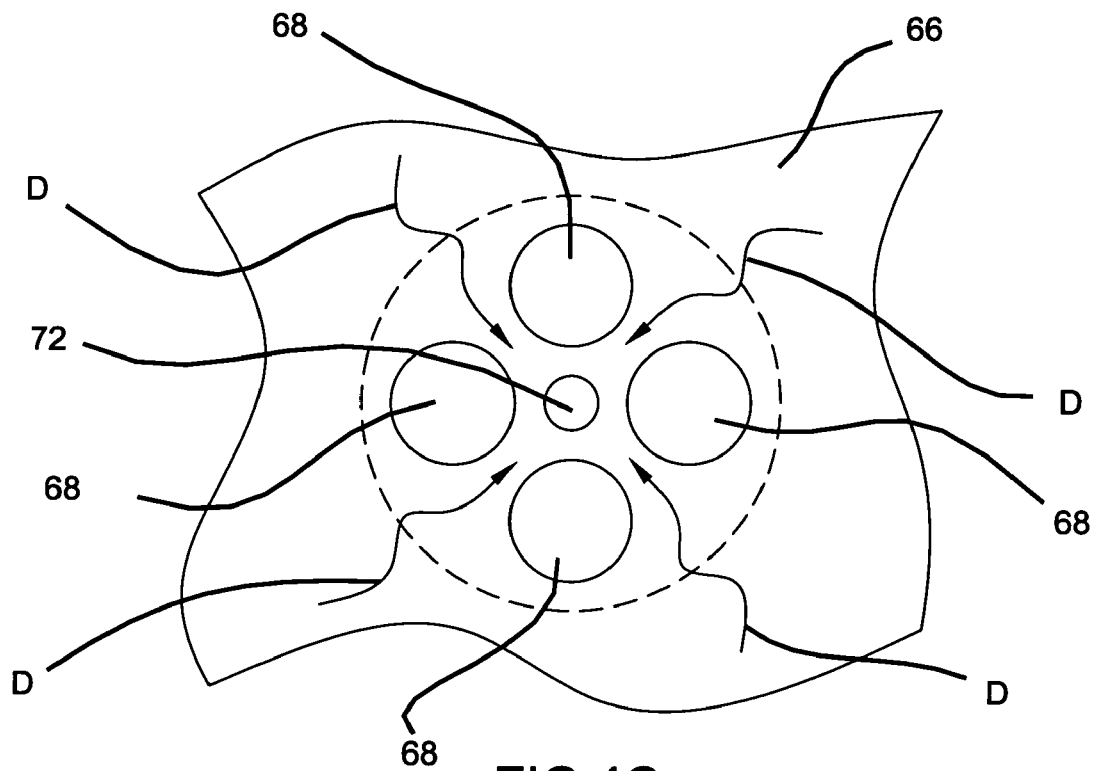
FIG. 4C is a detail of the inlet side of the separator plate.
Figure 4D:
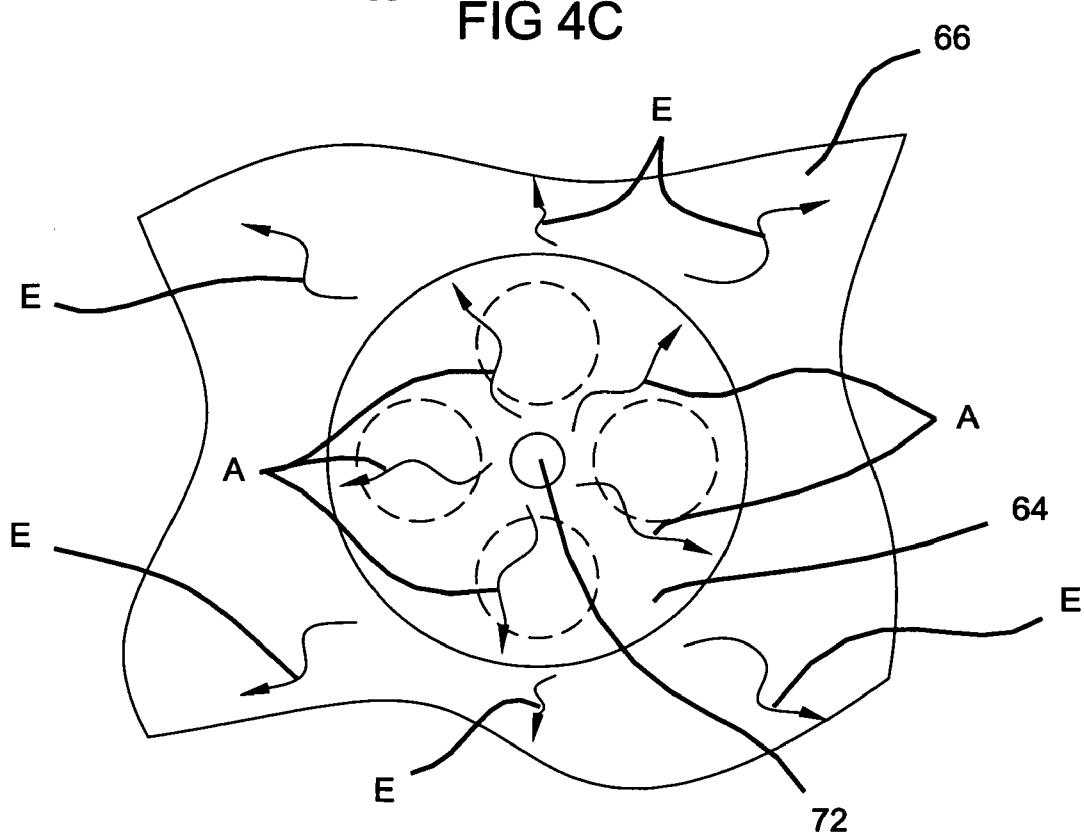
FIG. 4D is a detail of the exhaust side of the separator plate.

As shown in FIGS. 2 and 4D, the active area leg (A) is radial from the orifice 72 adjacent the surface of spacer 64. In this manner, a planar or 2-dimensional flow field, as compared with a channeled or 1-dimensional flow field, is provided which enables a differential flow distribution across the reactive face of the MEA. The dimension of the spacer 64 establishes the length of the flow path (A). The number of spacers 64 establishes the number of parallel paths. Thus, the planar flow field is similar to an interdigitated channel flow field but is much less susceptible to water blockage since the reactant gas is not constrained to flow in one dimension within the channel. This interdigitated-like flow field is beneficial because oxygen is carried through the primary current collectors by convection rather than diffusion allowing for significantly lower mass transport losses.

The perimeter of spacer 64 multiplied by the diffusion medium thickness establishes the cross sectional area of the flow path (A). The permeability of the diffusion medium establishes the permeability of the flow path. Hence, these parameters establish the pressure gradient and overall pressure drop of the active area leg (A) depending on the number of parallel paths over the active area. The degree to which an even flow distribution over each parallel path is achieved is determined by tolerances to which these parameters can be held. Because the dimensional variations (radius and thickness) are most likely small compared with the variation in diffusion medium permeability, the permeability of the diffusion medium determines how evenly flow becomes distributed. The flow field of the present invention is very effective at removing water since the pressure drop is concentrated over a relatively short active area leg. As a result, the gas velocity in this segment of the flow path is very high so that liquid water will be forcefully moved away from the velocity of the MEA and into the exhaust manifold where it can be expelled from the fuel cell.

Returning now to FIGS. 4B and 4D, the exhaust path (E) is defined from the point at which the reactant flow leaves the flow-interfering medium 30 at the edge 126 of the spacer 64 to the point the flow exits the separator plate 60 through the exhaust header 82. The exhaustive flow negotiates relatively freely (i.e., with no significant pressure drop or predetermined path) around the outer boundaries 126 of the spacer 64 and is contained within a frame or seal 130 (FIG. 2).

Turning now to FIGS. 6A and 6B, two separator plates 60, as described herein, are arranged in a back to back configuration and make up the bipolar plate 20. It is appreciated that the second sheet 76 as represented in FIG. 4A may comprise a single sheet when arranged in the bipolar plate 20. For clarity, a second separator plate is shown having like components and are referenced by numerals incremented by 200. In the configuration as shown, the separator plate 60 is arranged to deliver cathode reactant to the flow-interfering medium 30 and the separator plate 260 is arranged to deliver anode reactant to the flow-interfering medium 28. The electrical connectors 110 align with complementary electrical connectors 210 to provide electrical communication between adjacent MEAs 14 and 16.

Figure 7:
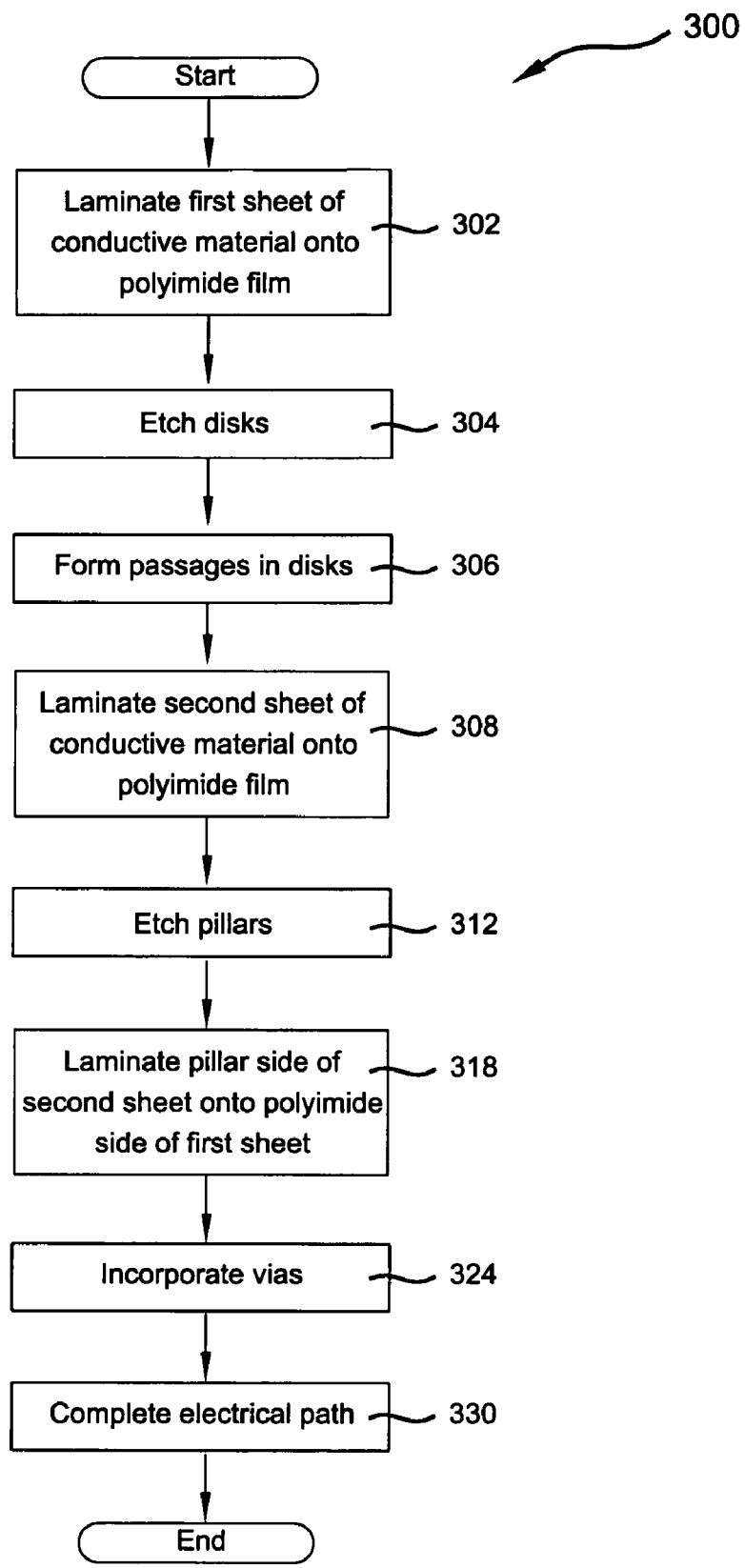
FIG. 7 is a flow diagram illustrating steps for making a separator plate according to the present invention.

With reference now to FIG. 7, a method of making the separator plate 60 is graphically present in a flow chart generally at reference 300. Construction of the flow field is accomplished using flex-circuit materials and fabrication techniques. In step 302, a first sheet of conductive material is laminated onto a gas impermeable polymeric film such as a polyimide film. The conductive material is preferably stainless steel having a thickness of 0.010" (10 mils) for example. The polyimide film is preferably 0.002" (2 mils) thick sheets of material. A suitable polyimide film includes Kapton® manufactured by the E.I. DuPont Corporation. In step 304, the conductive material is etched into a desired pattern such as an array of disks. After etching, the array of disks preferably extend 0.010" from the polyimide.

In step 306, the passages are formed in the disks. The passages may be formed by any suitable technique such as etching. In step 308, a second sheet of conductive material is laminated onto a second sheet of gas-impermeable polymeric film. As presently preferred, the second sheet of conductive material is 0.010" (10 mils) stainless steel and the second sheet of polymeric film is 0.002" (2 mils) Kapton® film. In step 312, the conductive layer is etched to form the pillars in a similar manner as described with respect to the disks. In step 318, the pillar side of the second sheet of polyimide film is laminated onto the first sheet of polyimide film on a surface opposite the disks. The space created between the first and second polyimide sheets defines the delivery path or inlet manifold. In step 324 vias are incorporated into the separator plate and extend through the second sheet of polyimide, through each of the pillars and through the first sheet of polyimide.

In step 330, electrically conductive material is disposed through the vias to form electrically conductive paths. The electrically conductive paths may be formed by filling the vias entirely with conductive material or by coating the circumferential wall of the vias with conductive material. The electrically conductive paths allow current to be carried across the entire flow field as well as between adjacent separator plates and ultimately the fuel cell stack as a whole.

Those skilled in the art can now appreciate from the foregoing description that the broad teachings of the present invention can be implemented in a variety of forms. For example, the number of spacers 64 shown on the separator plate 60 establishes the number of parallel flow paths and may be configured with fewer or greater disks. The geometrical configuration of the spacers 64 may alternatively comprise other shapes such as rectangles, triangles or trapezoids for example. Moreover, the pillars 68 defining the height of the inlet manifold 90 may comprise alternate shapes as described above. In addition, while it is shown that four pillars 68 compliment the single spacer 64, other ratios may similarly be employed. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel cell comprising:
a first planar manifold defined between a first gas-impermeable element and an active element;
a plurality of spacers disposed within said first planar manifold, each of said plurality of said spacers and said first gas-impermeable element having an orifice formed therethrough;
a second planar manifold defined between said first gas-impermeable element and a second gas-impermeable element in a subjacent relationship to said first planar manifold;
wherein a flow path is established from said second planar manifold, through said orifice, across said active element, and back into said first planar manifold.

2. The fuel cell of claim 1 further comprising an electrically conductive path extending through the fuel cell to provide continuity from said active element, through said plurality of spacers and said first gas-impermeable element to said second gas-impermeable element.

3. The fuel cell of claim 2 wherein said plurality of spacers are electrically conductive so as to establish said electrically conductive path.

4. The fuel cell of claim 3 wherein said electrically conductive path further comprises an electrically conductive filler disposed in a via formed through said first gas-impermeable element.

5. The fuel cell of claim 1 wherein said first gas-impermeable element is disposed in a substantially parallel spaced relation to said second gas-impermeable element such that said first planar manifold is substantially parallel with said second planar manifold.

6. The fuel cell of claim 1 further comprising a second plurality of spacers disposed within said second planar manifold.

7. The fuel cell of claim 1 wherein said plurality of spacers comprise a nested array of spacers disposed on said first gas-impermeable element.

8. The fuel cell of claim 1 further comprising a frame interposed between said first gas-impermeable element and said second gas-impermeable element.

9. The fuel cell of claim 1 wherein said plurality of spacers are equidistantly spaced on said first gas-impermeable element within said first planar manifold.

10. The fuel cell of claim 1 wherein said active element comprises a flow-interfering medium.

11. The fuel cell of claim 6 further comprising an electrically conductive path extending through the fuel cell to provide continuity from said active element through said plurality of spacers, said first gas-impermeable element, said second plurality of spacers, and said second gas-impermeable element.

12. The fuel cell of claim 11 wherein said plurality of spacers and said second plurality of spacers are electrically conductive.

13. The fuel cell of claim 12 wherein said electrically conductive path further comprises an electrically conductive filler disposed in a via formed through each of said first and second gas-impermeable elements.

14. The fuel cell of claim 6 wherein a subset of said second plurality of spacers are at least partially superposed over an area defined by a subjacent spacer of said plurality of spacers with said first gas-impermeable element interposed therebetween.

15. The fuel cell of claim 6 wherein a subset of said second plurality of spacers are completely superposed over an area defined by a subjacent spacer of said plurality of spacers with said first gas-impermeable element interposed therebetween.

16. The fuel cell of claim 6 wherein a subset of said second plurality of spacers comprises a superposed spacer over an area defined in part by a pair of subjacent spacers of said plurality of spacers.

17. The fuel cell of claim 6 further comprising a frame circumscribing said second plurality of spacers.

18. The fuel cell of claim 17 further comprising a header formed in said frame and in fluid communication with one of said first planar manifold and said second planar manifold.

19. The fuel cell of claim 18 further comprising a set of runners formed in said frame between said header and one of said first planar manifold and said second planar manifold.

20. The fuel cell of claim 6 wherein each spacer of said plurality of spacers comprise a disk with said orifice formed at a center thereof.

21. The fuel cell of claim 6 wherein each of said first and second gas-impermeable elements comprise polyimide film.

22. The fuel cell of claim 6 wherein each spacer in said plurality of spacers and said second plurality of spacers comprise stainless steel elements.

23. The fuel cell of claim 6 wherein said second plurality of spacers comprise a nested array of spacers.

* * * * *